United States Patent [19]
Sugimura

[11] 3,938,972
[45] Feb. 17, 1976

[54] IMPINGEMENT SEPARATOR FOR GAS-LIQUID MIXTURES

[75] Inventor: Shojiro Sugimura, Tamano, Japan

[73] Assignee: Mitsui Shipbuilding and Engineering Co., Ltd., Tokyo, Japan

[22] Filed: Sept. 5, 1973

[21] Appl. No.: 394,471

[30] Foreign Application Priority Data
Sept. 8, 1972  Japan.................................. 47-90125

[52] U.S. Cl..................................... 55/440; 55/446
[51] Int. Cl.².......................................... B01D 45/08
[58] Field of Search.............................. 55/440–446, 55/257, 426, 221, 183; 261/DIG. 11

[56] References Cited
UNITED STATES PATENTS

| | | | |
|---|---|---|---|
| 700,859 | 5/1902 | Thomas | 55/257 |
| 913,802 | 3/1909 | Barker | 55/446 |
| 1,109,588 | 9/1914 | Kluge | 55/440 |
| 1,142,483 | 6/1915 | Braemer et al. | 55/257 X |
| 1,916,528 | 7/1933 | Raymond | 55/442 X |
| 2,911,011 | 11/1959 | Niehart | 55/257 X |
| 2,921,647 | 1/1960 | Pietrasz | 55/426 |
| 3,405,511 | 10/1968 | Halter et al. | 55/440 |
| 3,517,486 | 6/1970 | Golden | 55/443 X |
| 3,748,832 | 7/1973 | Furlong | 55/257 |

FOREIGN PATENTS OR APPLICATIONS

| | | | |
|---|---|---|---|
| 354,633 | 6/1922 | Germany | 55/445 |
| 463,323 | 10/1913 | France | 55/440 |

Primary Examiner—Tim R. Miles
Assistant Examiner—N. Greenblum
Attorney, Agent, or Firm—Spensley, Horn and Lubitz

[57] ABSTRACT

An impingement separator for gas-liquid mixtures, in which at least two separating elements are spaced apart and held upright substantially in parallel to each other so as to provide a passage or passages for liquid-carrying gases. Each element consists of two outer plates bent in a zigzag fashion and spaced in a substantially parallel fashion with horizontal slits formed in the plate portions where the direction of the flow along the plate surfaces is deflected, and a bent inner plate intervening between the outer plates thereby defining liquid passages each facing one of the slits, so that an upward or downward stream or streams of the mixture impinge upon the baffling sections of the outer plates and the liquid is thereby separated out into the liquid passages through the slits and is collected away from the fluid.

2 Claims, 5 Drawing Figures

IMPINGEMENT SEPARATOR FOR GAS-LIQUID MIXTURES

BACKGROUND OF THE INVENTION

1. Field of the Invention

This invention relates to an impingement separator for gas-liquid mixtures which removes liquid from liquid-carrying gases by dint of impingement of the mixture upon baffle plates.

2. Description of the Prior Art

Gas-liquid separators of the impingement type admit gases laden with a liquid, which is to be separated from the gas, or a fluid consisting of a gas-liquid mixture, into bent, curved or baffled passages which cause the fluid to impinge upon the inner wall surfaces of the passages or baffles, so that the liquid sticks to the surfaces and flows down and away from the gases. To facilitate the removal of the lquid, it is customary to allow it to flow out by gravity. This, of course, necessitates a horizontal arrangement of flow passages, which presents many difficulties in the separation of liquid from either an upward or downward stream of gas-liquid mixture. An apparatus using baffles of wire meshwork which are designed to remove liquid from a rising or falling stream is well known in the art. This apparatus has a disadvantage in that after separation the gas stream and liquid flow through common passages with the liquid having an opportunity of being taken up and carried by the gases again. The disadvantage is eliminated by slowing down the flow of the gas stream by considerably enlarging the passages. This, in turn, requires separating elements of greater dimensions and hence a larger space for the equipment.

SUMMARY OF THE INVENTION

According to the present invention, gas-liquid mixtures in the form of upward or downward streams are separated by an apparatus comprising a plurality of separating elements held upright and in parallel to one another, each of the elements consisting of two outer plates bent in zigzag fashion to extend in a vertical direction and spaced substantially parallelly apart with horizontal slits formed in the plate portions where the flow direction of the fluid to be separated along the plate surfaces is deflected, and a bent inner plate intervening between the outer plates to form independent liquid passages divided completely from the passages for the gas-liquid mixtures by the bent inner plate and one of the outer plates may be spot-welded to the former, each of the liquid passages being communicated with one of the horizontal slits, and the inner plate being provided with a plurality of exits, each of which is located at a position corresponding to the bottom portion of each of the liquid passages to allow the liquid to flow downward through successive passages. The spaces between the elements serve as fluid passages, so that the upward or downward streams of the gas-liquid mixture impinge upon the baffling sections of the outer plates, and the liquid is thereby separated from the gas, enters the slits and is collected by the fluid passages. The separated liquid has no chance of being taken up or carried again by the gases. Consequently, the apparatus of this invention can separate gas-liquid mixtures and can do so with smaller fluid passages and still separate the mixtures more efficiently than the conventional separators designed to handle upward or downward streams.

DESCRIPTION OF THE PREFERRED EMBODIMENTS

Figure 1:
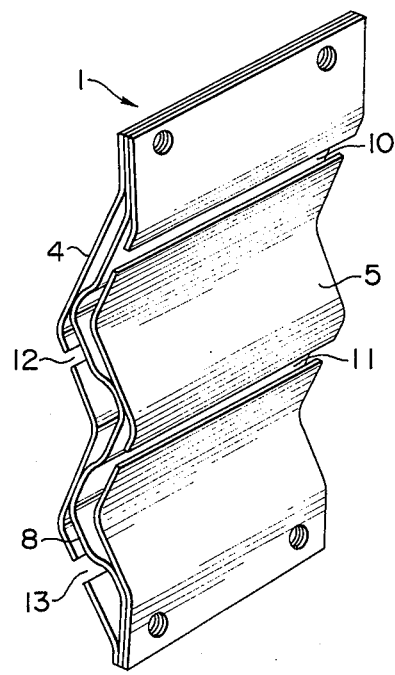
FIG. 1 is a perspective view of a unit element for gas-liquid separation according to the present invention.
Figure 2:
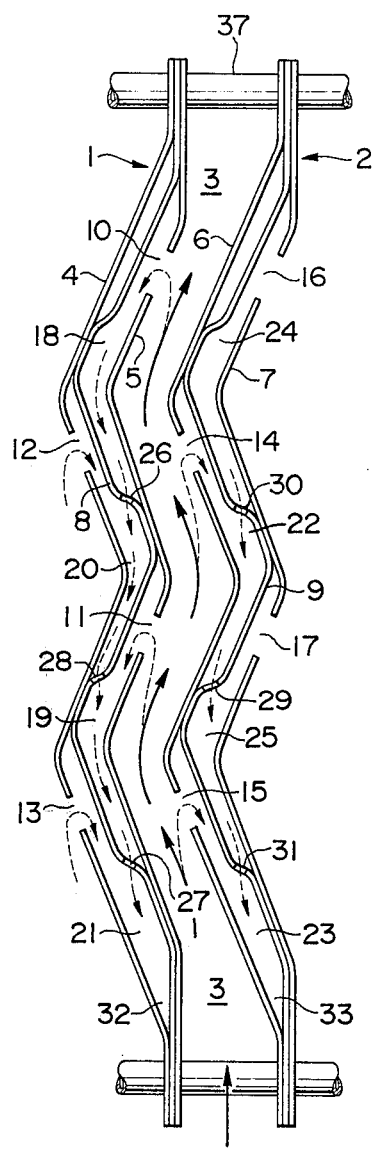
FIG. 2 is a side view of a pair of the separating elements combined to handle an upward stream of a fluid mixture.
Figure 3:
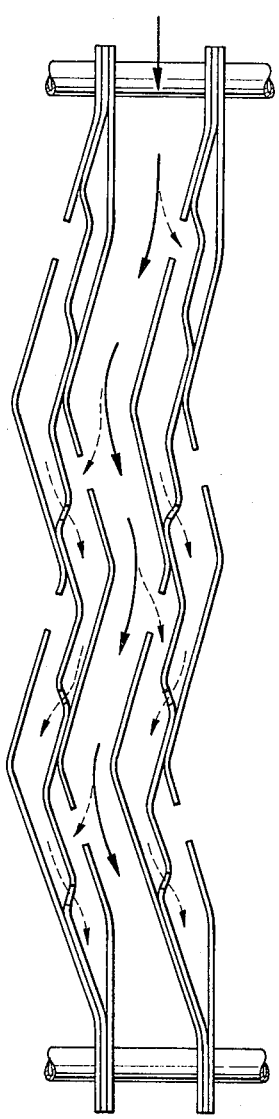
FIG. 3 is a similar view showing another pair of separating elements for treating a downward stream.

Referring to FIG. 1, there is illustrated a unit element 1 of the gas-liquid separator according to the present invention. In FIGS. 2 and 3 a pair of such elements 1, 2 are shown as constituting a fluid passage 3. The elements 1, 2 have two outer plates each, viz., 4, 5 and 6, 7, respectively. The outer plates are bent in zigzag fashion to extend in a vertical direction and are held apart in a parallel fashion except at the upper and lower ends. The pair of outer plates 4, 5 and 6, 7 enclose inner plates 8, 9 therein and closely sandwich them at both ends thereby securing them together in position.

The outer plates 4, 5 and 6, 7 are formed with horizontal slits 10–13, 14–17 at or near the heights of the zigzag fluid passage 3 where an ascending stream of liquid-containing gases (indicated by full-line arrows in FIG. 2) impinges upon the outer plates 5, 6 that form the inner walls of the passage, and is thereby forced to shift its rising direction.

The inner plates 8, 9 are so bent as to form independent liquid passages 18–21 and 22–25, each being communicated with one of the slits, and are fixed to the associated outer plates 4, 5 or 6, 7 by, for example, spot welding. The liquid passages have exits 26–28, 29–31 at their bottoms, so that the separated liquid flows successively downward to the bottoms 32, 33 of the passages 21, 23 at the lower parts of the elements 1, 2, and is thence drained out.

In the arrangement described above, a stream of liquid-carrying gases, or a fluid consisting of a gas-liquid mixture, enters the passage 3 at its bottom and travels upward in the direction indicated by full-line arrows. The stream first collides with the portion of the outer plate 6 of the element 2 having the slit 15. The collision enables a part of the liquid to leave the fluid and find its way through the slit 15 into the liquid passage 23 and run down to the bottom 33 of the passage. The fluid deflected by the impingement on that portion of the outer plate 6 thence collides with the portion of the outer plate 5 of the element 1 having the slit 11 and is thereby deflected again. Similarly the impingement causes a part of the liquid to run away from the fluid into the slit 11 as indicated by a broken-line arrow and thence into the liquid passage 19. The liquid continues to flow down through the exit 27 to the bottom of the lowermost liquid passage of the element 1. Next, the fluid strikes against the portion of the outer plate 6 of the element 2 in the vicinity of the slit 14. Simultaneously with the deflection of the fluid's ascending direction, separation of another part of its liquid content is caused in the same way as already stated. The separate liquid portion runs into the liquid passage 22 through the slit 14 and then into the passage 25 through the exit 29, down to the bottom 33 of the element 2 via the exit 31. As it further ascends through the passage 3, the fluid repeats the alternate impingement upon the outer plates 5, 6 in the manner so far described, each time losing a part of its liquid content as indicated by the broken-line arrows. The fluid is thus substantially freed from all the liquid before it reaches the top of the passage 3. With the arrangement of the vertical flow type impingement separator according to the present invention, separated liquid flows down through the independent liquid passages while being completely divided from the zigzag passages for gas-liquid mixtures and without coming into contact with any gas-liquid mixtures so that separated liquid is not taken up or carried again by the gas-liquid mixtures flowing through the separator. Therefore, the separating efficiency of the impingement separator can be enhanced.

FIG. 3 shows separation of a gas-liquid mixture during its descent. The construction and functions of the arrangement are exactly the same as those of FIG. 2, and therefore the description is omitted.

Figure 4:
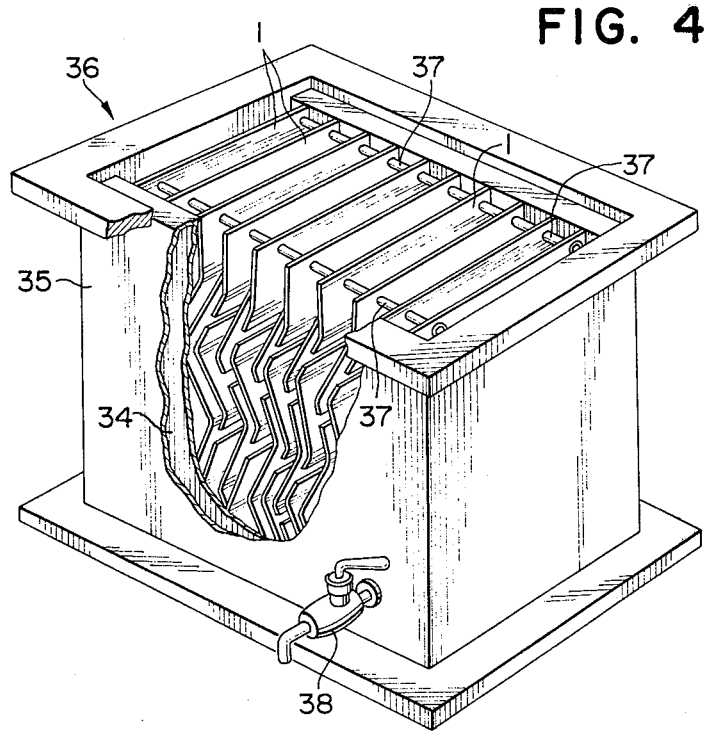
FIG. 4 is an assembled view, in perspective, of a separator embodying the invention, partly broken away and with simplified elements to show the structure.

While only a pair of separating elements 1, 2 have been described by way of illustration, actually a plurality of such elements are assembled to form a separator as shown in FIG. 4. The plurality of elements 1, each built as shown in FIG. 1, are held apart in a parallel fashion with spacers 37 as in FIG. 2 and are enclosed altogether in a casing 36, which is open at the top and bottom and has a double wall 35 on one side that is connected to one side of the elements, 1. Positioned so that one edge is Furthermore, the interior of the double wall, 34, is in fluid communication with the lower end of the lowermost liquid passage. A drain valve, 38, is positioned on the lower part of the outer wall, 35. In this apparatus, a raw fluid enters the casing 36 through its bottom opening, and is distributed among the elements in the form of divided streams. As the streams travel upward, they are gradually freed of the liquid in the manner stated, and finally the dry fluid streams emerge from the top opening of the casing. The liquid portions separated out from the rising streams cascade within the individual elements down to their bottoms and gather in the collecting chamber 34 defined by the double wall 35. Eventually the liquid is taken out of the chamber 34 by means of the drain valve 38. The arrangement of the separating elements 1 in the casing 36 may, of course, be modified so that the apparatus can handle downward streams as in FIG. 3.

Figure 5:
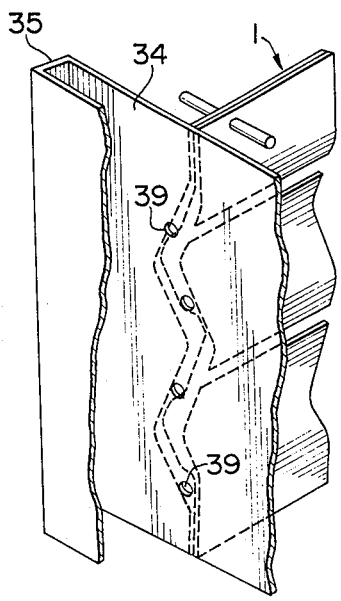
FIG. 5 is a fragmentary perspective view of another embodiment of the invention.

In the embodiment above described, the liquid portions separated and trapped by the liquid passages fall in succession through the exits of the individual passages until they gather at the bottoms of the lowermost passages in the respective elements. Alternatively, as indicated in FIG. 5, it is possible to form outlet ports 39 in the inner wall of the double wall 35 at points facing the bottoms of the individual liquid passages of the elements, and permit the individual passages to drain their contents into the collecting chamber 34.

I claim:

1. A vertical flow impingement separator for gas-liquid mixtures comprising at least two separating elements spaced and held upright substantially in parallel to each other so as to provide therebetween a passage or passages for gas-liquid mixture, each of said separating elements having a first and a second outer plate bent in zigzag fashion to extend in a vertical direction and spaced apart in a substantially parallel fashion except at upper and lower ends thereof, the second outer plate of one of said separating elements and the first outer plate of the other of said separating elements being so arranged to define therebetween a zigzag passage for the gas-liquid mixture, said first and second outer plates being provided with horizontal slits, each of which is disposed at a suitable position between an impingement position of the mixture upon the outer plates and a position at which the gas-liquid mixture is deflected at the next bent portion of the outer plate, so as to collect liquid which rushes out from the gas-liquid mixture due to inertial force directed out of the deflected stream of said mixture when said mixture flows along the separating elements in zigzag fashion, and a bent inner plate intervening between said first and second outer plates to form an independent series of liquid passages substantially separated from the passages for the gas-liquid mixture by the bent inner plate and either one of said first and second outer plates fixed to said bent inner plate, each of said liquid passages being communicated with one of said slits and said bent inner plate being provided a plurality of exits, each of which is located at a position corresponding to the bottom portion of each of the liquid passages to allow separated liquid to flow downward successively through said series of liquid passages whereby liquid separated from the gas-liquid mixture flows through said zigzag series of liquid passages without substantially being taken up or carried again by the gas-liquid mixture flowing through said zigzag passage, and is drained out at the lower end of the lowermost liquid passage.

2. A vertical flow impingement separator for gas-liquid mixtures, comprising a casing having a double wall structure on one side and the upper and lower ends of said casing being opened, and a plurality of the separating elements vertically disposed in parallel to and spaced apart from each other so as to provide therebetween passages for the gas-liquid mixtures, one side of each of said elements contacting with the inner wall of the double wall structure of said casing, each of said separating elements consisting of a first and a second outer plate bent in zigzag fashion to extend in a vertical direction and spaced apart in a substantially parallel fashion except at upper and lower ends thereof, the second outer plate of one of said separating elements and the first outer plate of the other of said separating elements being so arranged to define therebetween a zigzag passage for the gas-liquid mixture, said first and second outer plates being provided with horizontal slits, each of which is disposed at a suitable position between an impingement position of the mixture upon the outer plates and position at which the gas-liquid mixture is deflected at the next bent portion of the outer plate, so as to collect liquid which rushes out from the gas-liquid mixtures due to inertial force directed out of the curvature of deflection of the stream of mixtures when the mixtures flow along the separating elements in zigzag fashion, and a bent inner plate intervening between said first and second outer plates to form independent liquid passages completely divided from the passages for the gas-liquid mixtures by the bent inner plate and either one of said first and second outer plates fixed to said bent inner plate, each of said liquid passages being communicated with one of said slits and said inner plate being provided with a plurality of exits, each of which is located at a position corresponding to the bottom portion of each of the liquid passages to allow the separated liquid to flow downward through successive liquid passages, and further arranged so that the lower end of the lowermost liquid passage is in fluid communication with the interior of said double wall structure, whereby liquid separated from the gas-liquid mixtures, flows through said liquid passages without substantially being taken up or carried again by the gas-liquid mixtures flowing through said zigzag passage, and is drained out of said separating element at the lower end of the lowermost liquid passage into said double wall structure.

* * * * *